US007415958B2

(12) United States Patent
Boehm et al.

(10) Patent No.: US 7,415,958 B2
(45) Date of Patent: Aug. 26, 2008

(54) PROCESS FOR PROCESSING CYLINDER CRANKCASES HAVING SPRAYED CYLINDER BARRELS

(75) Inventors: Jens Boehm, Neuhausen (DE); Dieter Brackenhammer, Kirchheim (DE); Stefan Diessner, Wernau (DE); Axel Heuberger, Wildberg (DE); Patrick Izquierdo, Ulm (DE); Herald Pfeffinger, Tiefenbronn (DE); Dezsoe Schilling, Hemmingen (DE); Juergen Traber, Fellbach (DE); Nazario Vocino, Stuttgart (DE); Walter Zwink, Freiberg (DE)

(73) Assignee: Daimler AG, Stuttgart (DE)

( * ) Notice: Subject to any disclaimer, the term of this patent is extended or adjusted under 35 U.S.C. 154(b) by 235 days.

(21) Appl. No.: 11/196,299

(22) Filed: Aug. 4, 2005

(65) Prior Publication Data

US 2006/0032473 A1 Feb. 16, 2006

(30) Foreign Application Priority Data

Aug. 6, 2004 (DE) ....................... 10 2004 038 183

(51) Int. Cl.
*B23P 11/00* (2006.01)

(52) U.S. Cl. ................................ 123/193.2; 29/888.06

(58) Field of Classification Search .............. 29/888.06, 29/888.061; 427/446, 455; 123/193.2, 193; 92/169.1

See application file for complete search history.

(56) References Cited

U.S. PATENT DOCUMENTS

| | | | | |
|---|---|---|---|---|
| 4,761,039 | A * | 8/1988 | Hilaris | 299/36.1 |
| 5,271,967 | A * | 12/1993 | Kramer et al. | 427/455 |
| 5,380,564 | A * | 1/1995 | VanKuiken et al. | 427/456 |
| 5,626,674 | A * | 5/1997 | VanKuiken et al. | 118/317 |
| 6,589,605 | B2 * | 7/2003 | Shepley et al. | 427/444 |
| 6,719,847 | B2 * | 4/2004 | Rice et al. | 118/504 |
| 2004/0219290 | A1 * | 11/2004 | Nagaraj et al. | 427/140 |
| 2006/0026827 | A1 | 2/2006 | Boehm et al. | |
| 2006/0026828 | A1 * | 2/2006 | Boehm et al. | 29/888.061 |
| 2006/0026829 | A1 | 2/2006 | Boehm et al. | |
| 2006/0026830 | A1 * | 2/2006 | Boehm et al. | 29/888.061 |
| 2006/0026831 | A1 * | 2/2006 | Boehm et al. | 29/888.061 |
| 2006/0027205 | A1 | 2/2006 | Boehm et al. | |
| 2006/0027206 | A1 | 2/2006 | Boehm et al. | |

FOREIGN PATENT DOCUMENTS

EP 1 141 438 B1 3/2003

OTHER PUBLICATIONS

Office action dated Aug. 15, 2007 from U.S. Appl. No. 11/195,733.
Office action dated Aug. 14, 2007 from U.S. Appl. No. 11/196,295.

* cited by examiner

*Primary Examiner*—M. McMahon
(74) *Attorney, Agent, or Firm*—Crowell & Moring LLP

(57) ABSTRACT

In a process for processing cylinder crankcases having sprayed cylinder barrels, in which process a cylinder crankcase is cast, those surfaces of the subsequent cylinder barrels which are to be thermally coated are roughened, the cylinder barrels are coated by a thermal spraying process, and the cylinder barrels are remachined to final dimensions. After the thermal spraying process, coating material is at least partially removed from the crankshaft-side part of the cylinder crankcase.

15 Claims, 6 Drawing Sheets

FIG. 6
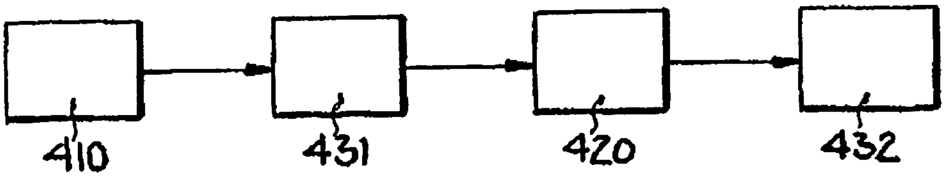
FIG. 7
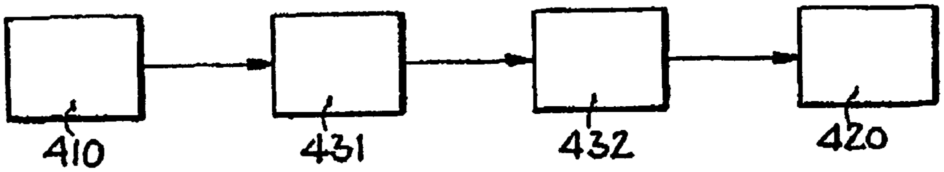
FIG. 8
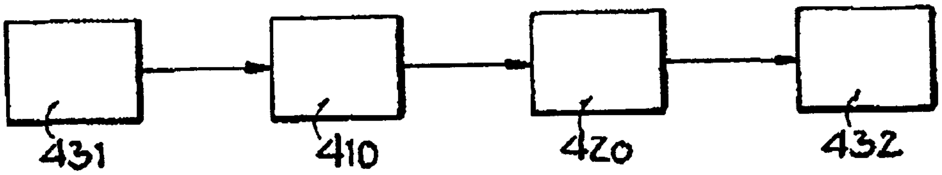
FIG. 9
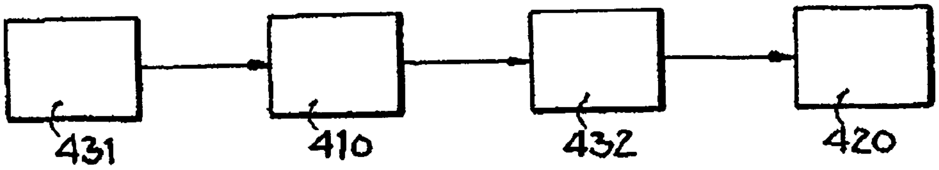
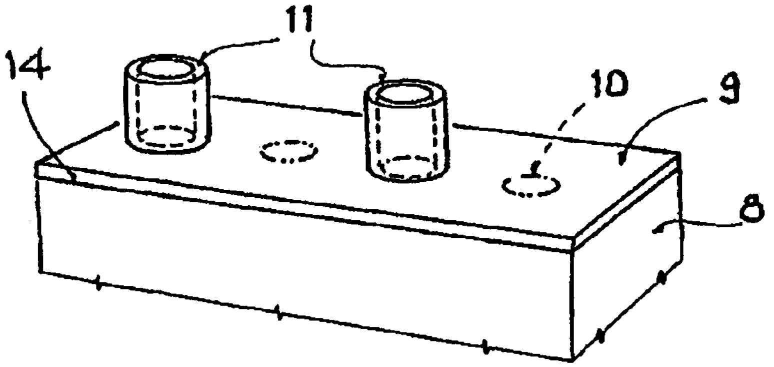
FIG. 10

PROCESS FOR PROCESSING CYLINDER CRANKCASES HAVING SPRAYED CYLINDER BARRELS

This application claims the priority of German application 10 2004 038 183.6, filed Aug. 6, 2004, the disclosure of which is expressly incorporated by reference herein.

BACKGROUND AND SUMMARY OF THE INVENTION

The present invention relates to a process for processing cylinder crankcases having sprayed cylinder barrels.

For production of engines with thermally sprayed cylinder bearing surfaces, it is known from European document EP 1 141 438 B1 to cast, clean and degrease a cylinder crankcase, to roughen the cylinder bores by means of corundum or sand blasting, and then to thermally coat the cylinder bores. The coating and roughening operations use a template which covers cylinder bores which are not to be processed at that time and may have exchangeable consumable layers on the inner side. After the coating operation, the cylinder crankcase is machined to its final dimensions.

Despite the advantages of this process, in particular the bonding of the sprayed layer which subsequently forms the cylinder bearing surface is in need of improvement. Furthermore, the outlay on equipment is very high. This is also true of the production costs.

One object of this invention is to develop a process which allows good bonding of the layer to be achieved, while production is as economical as possible, with as low a scrap rate as possible.

This object is achieved by a process for processing cylinder crankcases having sprayed cylinder barrels in which a cylinder crankcase is cast, those surfaces of the subsequent cylinder barrels which are to be thermally coated are roughened, and the cylinder barrels are remachined to their final dimensions. The following text describes a process for producing a cylinder crankcase with thermally sprayed cylinder liners, clearly revealing the advantages attributable to the invention. This route is selected since the advantages in some cases only manifest themselves at a completely different location. During production, a cylinder crankcase is cast. The material used for the cylinder crankcase, which is preferably produced as a shaped casting, particularly preferably as a pressure die casting, is a gray cast iron material or a light metal material, such as an aluminum alloy.

A cast cylinder crankcase according to the invention has an oversized dimension at least in the region of the cylinder head sealing surface and, in the case of a four-cylinder engine, has four cylinder bores arranged in line. The walls of the cylinder bores are provided with a bearing surface layer. The bearing surface layer is applied, after preprocessing of the cylinder bores or of the cylinder crankcase, by way of a thermal spraying process and, in particular, a plasma and/or arc wire spraying process.

The materials used here are preferably thermal spraying materials which are customary for such purposes, preferably Fe-containing materials. The layer thickness of the bearing surface layer is usually several hundred micrometers and, preferably, at least 150 micrometers.

After casting, the cast cylinder crankcase is cleaned and degreased. Then, the surface of the cylinder bores is roughened. It is preferable for roughening to be carried out by way of a fluid which is blasted onto the walls at a high pressure (several hundred to several thousand bar). In this case, as in the case, for example, of sand blasting, it is also possible for solid particles, such as sand or corundum, to be added to the blasting fluid. In the present application, processes of this type are referred to merely as blasting processes or as blasting machining, for the sake of simplicity.

It is preferable to use a particle-free water jet to which 1-5% by volume of a liquid cleaning agent and/or a liquid preservative has been added. The use of the preservative at least reduces the risk of the blasted cylinder crankcase and the device suffering corrosion, with the cleaning agent being used for further or better removal of impurities or residual coverings, such as center sleeve parting agents used in pressure die casting.

If the blasting machining uses a water jet of this type, it is expedient that a cylinder crankcase which has been blasted in this manner does not require any complex cleaning processes. This is associated, inter alia, with a reduction in overall processing costs, less space being taken up by the machines, and reduced investment costs.

The blast machining which is provided for the purpose of roughening can advantageously be used not only to roughen the surface to be coated, but also at the same time to clean and degrease the walls of the cylinder bores. In this case, it is particularly appropriate to use liquid cleaning agent. This, inter alia, reduces a working step and therefore the machine costs, with a simultaneous associated reduction in processing time and costs per item.

Since the hardness may vary along the axial extent of the cylinder bore, it is expedient for the time of action on the wall of the cylinder bore which is to be machined to be selected in such a manner that, where the hardness of the wall is lowest, the amount of material removed plus the internal diameter which then remains corresponds at most to the subsequent final dimension minus the minimum application of material required for the bearing surface layer. In this context, tests have shown that it is favorable to remove at most between 0.020 and 0.140 mm, preferably between 0.004 mm and 0.006 mm.

In anticipation of the further process, it should also be mentioned in this context in particular that to improve the subsequent bonding of the sprayed layer to the cylinder crankcase, it is expedient for the cylinder bore—as seen in the direction of the crankshaft—to also be roughened at least slightly (a few mm) beyond the region of the subsequent cylinder bearing surface on the crankshaft side in the manner described, and also for it to be cleaned, degreased, and, if appropriate, machined in a suitable way.

Surprisingly, it has been established that when using a (high-pressure) blasting process, it is expedient for a lance which guides the jet and is directed onto the wall of the cylinder bore to be operated in such a manner that it is for some time activated outside the cylinder bore. This means that it is operated at most at the subsequent working pressure with the fluid, in particular with water or a fluid provided with solid particles. Then, the lance is introduced into the cylinder bore, and the walls are covered by the jet and processed in the desired way.

Of course, to reduce the operating times and therefore also, inter alia, to reduce costs, it is expedient for a plurality of roughening lances to be used for the roughening and/or the machining by means of blasting and/or the cleaning and degreasing which is expediently carried out in the process, in particular by the addition of the cleaning agents and/or preservatives. Surprisingly, it has been established that with this procedure it is expedient for these lances to be operated in such a manner that they are activated not only—as mentioned in the case of the use of a single lance—for a certain time outside the cylinder bore, but also for the jets which escape in the process to be directed onto a baffle surface. The baffle surface in this case advantageously serves to stabilize the working jet and therefore to improve the reproducibility of the working results.

In a preferred configuration of the baffle surface in the form of a hollow cylinder, in which the jet outlet for the jet is to be arranged, the lances can, in an improved version, be rotated without problems, as is already the case for covering the walls of the cylinder bores with the jet. This reduces interference with the two lances by the other lance in each instance. The baffle surfaces which concentrically surround the lances are preferably made from a hard metal or reinforced steel (e.g. in particular case-hardened steel No. 1.7131 (16MoCr5)), so that the abrasive action of the jets, which are passed out of the lances from a fan jet nozzle, despite their extremely high pressure, is relatively slight, and the service life of baffle surfaces of this type is very long.

The same objective is also served by the use of a single pressure source for the lances which are in use, since in this case identical or similar working results can be assumed for the cylinder bores which have been processed in each instance. This has a particular influence on the above mentioned machining of the wall of the cylinder bore which is subsequently to be coated.

If a plurality of lances are used for simultaneous processing of a plurality of cylinder bores belonging to a line of cylinders, these lances are expediently not introduced simultaneously into cylinder bores which directly follow one another. Instead, at least one cylinder is to be left clear between the cylinder bores into which the lances are introduced. This, inter alia, reduces the influence which the lances have on one another and the potential threat to the lances, in particular from their jets. In particular, the guidance of the lances is also simplified, since the free space between two lances is increased.

In cylinder crankcases with an odd number of cylinder bores, when using a plurality of jet lances simultaneously, it is expedient for at least one to be configured such that it can be moved in the axial direction independently of the other and/or for them to be operated separately from one another with the blasting fluid, i.e. in particular with water. As a result, by way of example, one of the lances, when it is not arranged in a cylinder bore, can be switched off and/or operated in the region of the baffle surface and/or remain in an at-rest position, while the other blasting lance is applying the jet to one of the cylinder bores.

It is preferable for the cylinder crankcase to be fitted with one or more hollow-cylindrical baffle surfaces within the blasting machining unit, specifically in the region in which the blasting lances are also introduced into the cylinder bores. It is expedient for the baffle surfaces in this case to be arranged on a guide, by means of which they can be lowered onto the cylinder head sealing surface and put or placed and fixed on it in a defined position. For this purpose, the guide for the baffle surfaces is expediently arranged around a lance, so that the lance can be arranged within the hollow-cylindrical baffle surface and the baffle surface can be guided concentrically around the lance.

After blast machining, the cylinder crankcase, which may have been preprocessed, in particular face-milled, on the cylinder head sealing surface but still has an oversized dimension of preferably between 0.3 and 0.7 mm and particularly preferably between 0.4 and 0.5 mm, is removed from the blast machining unit. The blast machining unit preferably has a turntable with at least two receptacles, so that simultaneous loading of the machining unit in the region of the lances and removal and/or loading of a receptacle is possible. Alternatively, this can also be realized by linear drives or other similar customary production tools.

After blast machining, i.e. at least roughening of the walls of the cylinder bores, the cylinder crankcase is tilted. For this purpose, the cylinder crankcase is rotated about a longitudinal axis of a cylinder line, so that an acute angle between the axial axis of a cylinder bore and the field line of the weight is present at least in a rotary position which is held at least for a short time. It is preferable for the cylinder crankcase, starting from the initial position defined by the cylinder head sealing surface facing upwards, is rotated through more than 90° (120°, 170°). In this context, it is proven expedient for the cylinder crankcase to be rotated as slowly as possible. In particular, the movement into this tilted position should last at least five seconds. It is preferable for at most the time which can be made available by the cycle time of the processing line to be used for this tilting. It is expedient for the cylinder crankcase even to be rotated through one full revolution about its longitudinal axis. During this tilting, inter alia the blasting fluid is at least in part removed in a simple way from the cylinder bores and in particular from desired recesses or undercuts and also recesses and/or undercuts which are also desired for the bonding of the subsequent coating and which were formed by the roughening operation.

It is expedient for the tilting of the cylinder crankcase to take place during the time in which it is being transported from the point of removal from the blasting machining unit into a drying processing unit. During this time, the cylinder crankcase can expediently also be acted on by compressed air which has preferably been heated to at least 50° C., particularly preferably to at least 70° C. This measure improves the removal of the blasting fluid still further.

In the drying processing unit, the cylinder crankcase is heated after it has been roughened, and the residual moisture is at least substantially, and optimally completely, removed. A standard furnace, the interior air of which is continuously recirculated and if appropriate also dried, can be used for this purpose. Furthermore, within the furnace it may be expedient to continue to blow hot air onto the cylinder crankcase.

After drying, the cylinder crankcase is transferred to a thermal coating processing unit, inside which the cylinder bores are coated in order to form what will subsequently be the cylinder bearing surfaces. The thermal coating processing unit, like the blasting processing unit, preferably likewise has a turntable with at least two receptacles, so that, in this case too, simultaneous loading of this processing unit in the region of coating lances and removal and/or loading of a receptacle is possible. Alternatively, this can also be realized by linear drives or other standard production tools of this type.

It is preferable for the cylinder crankcase to be provided with at least one spraying template, which is designed as a piece of tube and therefore in hollow-cylindrical form and the clear width of which is greater than the clear width of a cylinder bore, in the region of the coating processing unit. The axial length of this spraying template approximately corresponds to the width of the thermal spraying jet, i.e. approx. 20 to 30 mm. The spraying template is preferably fitted outside the region of the coating processing unit in which a coating lance is arranged. As a result, in the case of a spraying template which has already been used, this template can be checked and if necessary removed in good time, for example if it is excessively soiled and/or the coating material is thought to have low adhesion, without involving significant intervention in the actual production sequence. It is expedient for the spraying template to be put or placed in a defined position on the cylinder head sealing surface in the region of the outer receptacle of the coating unit and fixed there. In this case, a single tubular spraying template is provided for a cylinder bore; it is possible to provide at least a single cylinder bore, but also a plurality of or all of the cylinder bores, of a cylinder crankcase with an associated tubular, hollow-cylindrical spraying template. In this case, a preferably continuous circular ring is formed between the inner wall of the spraying template and the cylinder crankcase in the region of the cylinder bore shielded by the spraying template. The thickness of the circular ring is at most 1 cm and is preferably between 0.3 and 0.7, particularly preferably approximately 0.5 mm.

The cylinder crankcase, which has now preferably been provided with a hollow-cylindrical spraying template similar to a piece of tube on the cylinder head sealing surface and still has an oversized dimension of preferably between 0.3 and 0.7 mm, particularly preferably between 0.4 and 0.5 mm, is introduced into an inner region of the coating processing unit, in which the coating of the walls of the cylinder bores is to be carried out by a thermal spraying process. The cylinder crankcase, which is held at a defined position with a spraying template arranged in a defined position on it, is transported under a coating lance, which is configured such that it can rotate about its longitudinal axis.

Furthermore, if only a single hollow-cylindrical spraying template is being used, the cylinder crankcase may likewise be configured such that it can rotate about this axis, the axis then being aligned with the axis of the individual cylinder bore which is to be coated. When adopting a procedure of this nature, it is advantageous if in each case only a single cylinder bore of a line of cylinders is thermally coated.

For this purpose—as also in the other cases—it is possible for an individual hollow-cylindrical, tube-like spraying template to be provided for each individual cylinder bore or for a plurality of cylinder bores or for all the cylinder bores; the spraying template may for its part once again be arranged on a base plate.

It is preferable for the coating lance to be started outside the cylinder bore, in order to rule out transient initial effects. In this case, the spray jet may, for example, be directed onto the inner surface of the spraying template, in order in particular to reduce soiling of the installation. After an initial running time, the coating lance is moved into the cylinder bore, and the coating is applied in a desired minimum thickness in accordance with a predeterminable working sequence. During the application of the coating, it is expedient for a gas, preferably an inert gas, to be passed through the cylinder bore so as to partially remove spray particles from the bore. The flow velocity in this case is expediently between 7 and 12, preferably approximately 10 m/s.

To coat a respective cylinder bore, a single cylinder bore or a plurality of cylinder bores or all the cylinder bores can be with and without separate retraction and refitting with spraying template The processing station described for the coating of the cylinder bores with a layer which has been thermally sprayed and preferably applied by means of an arc wire spraying process (AWS process), therefore includes a blasting processing unit and a coating processing unit. It is expedient for each of these units to be assigned a loading station, which simultaneously forms a removal station, so that the units can be loaded with cylinder crankcases for the respective working step and finished cylinder crankcases can be removed again at the same station. The blasting and coating processing units are also assigned a dry processing unit, in which the cylinder crankcase is heated after the blasting operation and the blasting fluid is at least substantially removed.

After the cylinder bore has been coated, the cylinder crankcase is removed from the coating processing unit and transferred to the further, chip-forming processing operation. Here, the sprayed C, i.e. the cylinder barrel, preferably cylinder bore, is rough-honed, a bevel is introduced in the region of the cylinder head sealing surface, the cylinder head sealing surface is milled to its final dimension, preferably by means of disposable cutting tool tips, and the cylinder barrels are finish-honed to their final dimension in one or more steps. Apart from the rough-honing and finish-honing, which at least have to follow one another in terms of time, these machining working steps can in principle be carried out in any desired order.

It is appropriate, however, for the bevel to be introduced after the rough-honing, since in this case the finished cylinder bearing surface is no longer soiled or is only slightly soiled. The same also applies to the milling of the cylinder head sealing surface to its final dimension. It is expedient for the bevel to be formed in such a way, in terms of its inclination and depth of introduction, that it has no sprayed material, but rather only cast material, at the subsequent transition between the bevel and the cylinder head sealing surface which has been machined to its final dimension. It is therefore expedient for the bevel to be formed after the rough-honing and before the finish-machining of the cylinder head sealing surface and of the cylinder barrel. On account of this sequence, the finished cylinder bearing surface is no longer soiled or is only slightly soiled, and furthermore the bonding of the sprayed material is improved, since it is no longer at risk, for example by being lifted off by means of a cutting edge, from the face-milling of the cylinder head sealing surface to its final dimension. With all the actions which have been mentioned and also those which are yet to be described below, it is also expedient for the cutting edges of the respective machining tools to engage in the material which is to be removed from the outside, i.e. approximately parallel to the surface orthogonal. This at least reduces or even altogether prevents detachment of a material as a result of the cutting edge engaging from below with the material subsequently being lifted off by the cutting edge.

It is preferable for a cone (countersinking drill, milling cutter or the like) mounted in universally jointed fashion to be used to introduce the insertion bevel, the cone having, at its introduction end side, a guide pin, the external effective diameter of which is selected in such a manner that in terms of the machining tolerances it corresponds at most to the smallest clear width of the coated cylinder bore.

The guide pin is designed as a honing head, the cutting edges of which are matched to the final dimension of the cylinder bearing surfaces. It is preferable for the honing head to have cutting edges which can move in the radial direction and which can be locked in the at-reset position and in the working position. This allows the introduction of the bevel and the honing to be carried out in a single operation within one processing station.

It is expedient for the guide pin to be placed against the cylinder bore, oriented at an inclination with respect to the longitudinal axis of the latter in the region of the subsequent insertion bevel, and thereby aligned. After floating and/or vibrating and/or shaking alignment, the guide pin is oriented axially parallel to, and preferably aligned with, the longitudinal axis of the cylinder bore. After or during the axial orientation of the insertion pin, the latter is simultaneously lowered at least part way into the cylinder bore.

As in the region of the cylinder head sealing surface, inter alia to improve the bonding of the sprayed material, it is expedient for the coated cylinder bore of the cylinder crankcase to be provided with an end bevel in the region of the crankshaft outlet side. The end bevel is designed in such a manner that there is no coating material, but rather only the cast or base material, at the transition from the end bevel to the crankshaft space. After the end bevel has been introduced, coating material which has been deposited during the thermal spraying is removed at least partially from the crankshaft-side part of the cylinder crankcase, i.e. from the crankshaft space. The coating material is removed by a jet 70 (FIG. 2), preferably a liquid jet mixed with solid particles and/or a water jet, which is operated with a pressure of between 300 and 1000 bar, preferably between 300 and 600 bar. Between 1 and 5% by volume of cleaning agent and/or preservative are added to the jet. Therefore, the same fluid which was already used during the roughening operation can be used as blasting fluid for cleaning the crankshaft space. However, the difference is that a significantly lower pressure is used in this case. The material which continues to adhere to the walls of the crankshaft space after this pressurized-jet cleaning can remain there since, as tests have proven, it does not become detached even under extremely high loads. In this case too, to avoid unnecessary soiling of the cylinder bearing surface, it is expedient for the cylinder bore only to be machined to its final dimension after the end bevel has been introduced. Furthermore, it is also expedient for the machining of the cylinder bore to its final dimension only to be carried out after the finish-machining of the crankshaft space.

In the same way as for introduction of the insertion bevel, a circular milling cutter can be used to introduce the end bevel. It is expedient for a guide pin, the external effective diameter of which is selected in such a manner that in terms of the machining tolerances it corresponds at most to the smallest clear width of the coated cylinder bore, is expediently arranged at the introduction-side end of this circular milling cutter. The further formation and expedient procedures can be inferred from what has already been described above.

Alternatively, it is possible for a cone mounted in universally jointed fashion to be used to introduce the end bevel in the same way as for the introduction of the insertion bevel. It is expedient for a guide pin, the external effective diameter of which is selected in such a manner that in terms of the machining tolerances it corresponds at most to the smallest clear width of the coated cylinder bore, to be arranged at the introduction-side end of this cone. The further formation and advantageous procedures can be discerned from what has already been described.

As has already been mentioned, it is expedient to ensure that during chip-forming machining of the insertion bevel and/or of the end bevel and/or of the cylinder head sealing surface and/or of the crankshaft space and/or of the cylinder bore, the respective machining tool is guided in such a manner that the respective cutting edges penetrate into the layer material which is to be removed from the outside.

During the cleaning/removal of coating material from the crankshaft space, it is expedient for the cylinder to be covered. For this purpose, a ram is introduced into the cylinder or moved onto the end bevel. It is preferable for the ram to be placed against the end bevel in such a manner as to form a circumferential and/or end seal, and preferably for the ram to form a sealing closure at the end bevel with the aid of a seal.

In engines with cylinders arranged in a number of lines (for example V or W engines), to prevent the introduction of spray material it is expedient for the individual lines to be shielded from one another in the region of the crankshaft space at least during the thermal coating by the introduction of a shielding template. For this purpose, the shielding template preferably has an elastomer layer which is arranged between two metal sheets and which can be placed against the walls of the crankshaft space in the region between two rows. In this case, it is expedient for both the metal sheets and the elastomer layer to be of a shape which is the negative of the contour to be applied. It is preferable for the metal sheets, when the shielding template is put in place, to be at a distance from the wall, whereas the sealing elastomer of the elastomer layer bears against the wall.

Further expedient configurations of the invention are defined in the claims. Moreover, the invention is explained in more detail on the basis of exemplary embodiments illustrated in the figures.

BRIEF DESCRIPTION OF THE DRAWINGS

FIGS. 3-9 show various flow diagrams for the chip-forming finish-machining of a coated cylinder crankcase, FIG. 10 shows a cylinder crankcase with baffle surfaces fitted in the region of its cylinder head sealing surface.

DETAILED DESCRIPTION OF THE INVENTION

Figure 1:
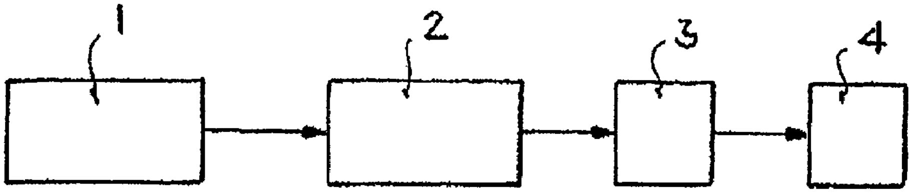
FIG. 1 shows a flow diagram of the overall process.

FIG. 1 illustrates a basic sequence of a process for producing cylinder crankcases with thermally sprayed cylinder barrels. According to this diagram, in a first processing station 1 the blank for the cylinder crankcase 8 is cast and if appropriate also initially processed in a processing unit (not shown) of this processing station. The preliminary processing may in this case involve the removal of slag, casting residues and also face-milling of the cylinder head sealing surface 14 to an oversized dimension.

After this first processing station 1, the cylinder crankcase 8 is transferred to a second processing station 2, in which it is, for example, cleaned and degreased, and the walls of the cylinder bores 10 are machined and roughened in regions. For this purpose, the second processing station 2 may have an individual processing unit for each of these working steps or may also have processing units which carry out a number of working steps or complement one another. In particular, in this context reference should be made once again to the abovementioned multiple action of, for example, a water jet at high pressure mixed with corrosion-prevention agents and/or cleaning agents which are in liquid form or dissolved in the water, this water jet simultaneously having cleaning, degreasing, machining and roughening actions.

After this pre-treatment, the pre-treated cylinder crankcase 8 is transferred to a third processing station 3, in which the cylinder bores 10, and preferably, beyond the axial ends of the cylinder bores 10, in regions also the cylinder head sealing surface 14 and the crankshaft space 55 are coated in the known way, in particular thermally coated.

After the coating of the cylinder bores 10, the cylinder crankcase which has been provided with the sprayed cylinder barrels is transferred to a fourth processing station 4, in which it is machined, by chip-forming machining, to its final dimensions. In this fourth processing station 4 or subsequent to it, it is also possible for the crankshaft space 55 to have relatively loose spraying residues from the thermal coating removed from it by means of the abovementioned high-pressure cleaning.

Figure 2:
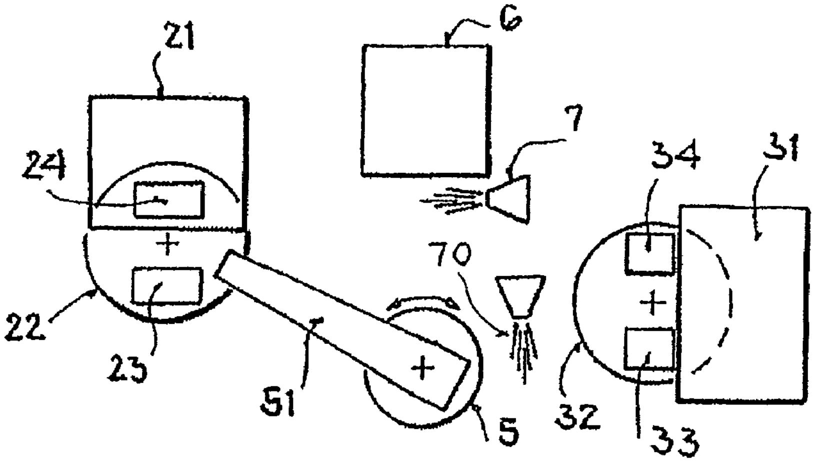
FIG. 2 shows a diagram illustrating a possible processing station from at least the roughening to the coating.

FIG. 2 shows a more detailed illustration combining the processing units of the second processing station 2 and the third processing station 3. The configuration shown in FIG. 2 comprises a blasting processing unit with a blasting processing chamber 21 and associated turntable 22, a drying processing unit 6, a compressed air unit 7, a multi-axis industrial robot 5 for loading and removing the various processing units and a coating processing unit with coating chamber 31 and associated turntable 32. The turntables 22 and 32 each have at least two receptacles 23, 24 and 33, 34, on which a cylinder crankcase 8 can be placed and from which it can be removed.

In the blasting chamber 21, the cylinder bores 10, which have previously been provided with baffle surfaces 11 for the fluid jet expelled from the nozzles of the blasting lances, are prepared in the manner mentioned, i.e. are cleaned, degreased, machined and roughened. Then, they are moved out of the blasting chamber 21 by means of the turntable 22, while at the same time the next cylinder crankcase 8 is introduced into the blasting chamber 21. The pre-treated cylinder crankcase 8 is transported by means of the industrial robot 5 to the drying processing unit 6, during which operation it is expediently rotated slowly about its own longitudinal axis and exposed to warmed or heated compressed air by means of the compressed air unit 7. Previously, the hollow-cylindrical baffle surfaces 11, similar to pieces of tubes, have also been removed from the cylinder head sealing surface 14 of the cylinder crankcase 8.

The rotation of the cylinder crankcase 8 and the application of compressed air advantageously serve to at least partially remove the blasting fluid, preferably from the recesses and undercuts of the roughened walls of the cylinder bores 10. Blasting fluid which still remains is removed in the drying processing unit 6. The dried cylinder crankcase 8 is placed onto a free receptacle 34 of the turntable 32 of the coating processing unit, provided with spraying templates 12 and introduced into the coating chamber 31, where it is coated in the known way.

FIGS. 3 to 9 illustrate various flow diagrams involved in the chip-forming finish-machining of the coated cylinder crankcase.

Figure 3:
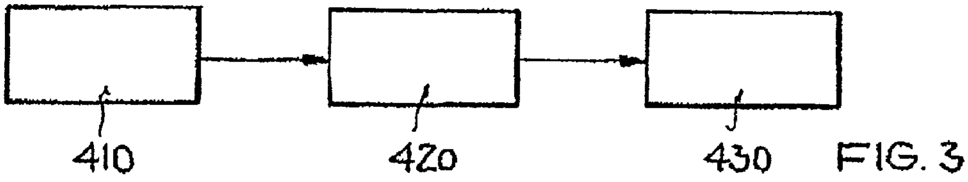

In accordance with FIG. 3, first of all the insertion bevel 54 is formed (410) at the bores of the sprayed cylinder crankcase 8, then the cylinder head sealing surface 14 is finish-machined (420), and then the cylinder bore 10 is finish-machined (430) in one or more steps. In this context, it is favorable that the finished cylinder bearing surfaces 53 at least require no further significant cleaning.

Figure 4:
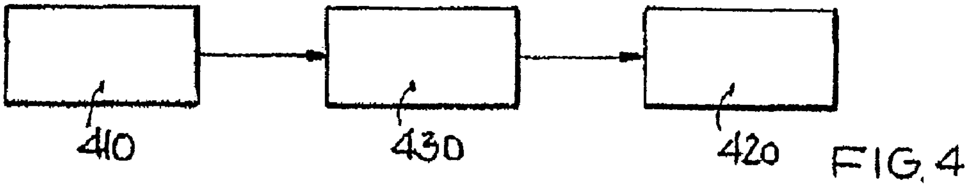

In accordance with FIG. 4, first of all the insertion bevel 54 is formed (410) at the bores of the sprayed cylinder crankcase 8, then the cylinder bores 10 are finish-machined (430) in one or more steps, and then the cylinder head sealing surface 14 is finish-machined (420). In this case, the finished cylinder bearing surfaces 53 still require final cleaning.

Figure 5:
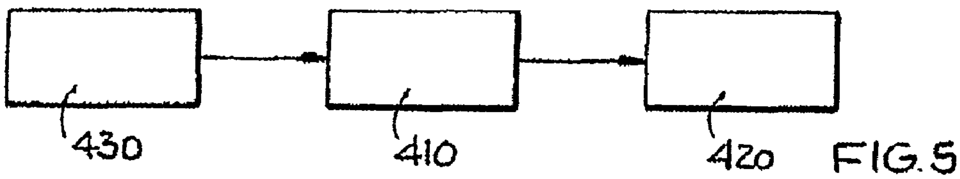

In accordance with FIG. 5, first of all the cylinder bores 10 are finish-machined (430) in one or more steps, then firstly the insertion bevel 54 is formed (410) at the bores 10 of the sprayed cylinder crankcase 8, and thereafter the cylinder head sealing surface 14 is finish-machined (420). In this case, the finished cylinder bearing surfaces 53 likewise still require final cleaning.

In accordance with FIG. 6, first of all the insertion bevel 54 is formed (410) at the bores 10 of the sprayed cylinder crankcase 8, then the cylinder bores 10 are rough-machined (431), then the cylinder head sealing surface 14 is finish-machined (420) and then the cylinder bores 10 are finish-machined (432). In this case, the finished cylinder bearing surfaces 53 at least require no significant further cleaning.

In accordance with FIG. 7, first of all the insertion bevel 54 is formed (410) at the bores 10 of the sprayed cylinder crankcase 8, then the cylinder bores 10 are rough-machined (431), then the cylinder bores 10 are finish-machined (432), and then the cylinder head sealing surface 14 is finish-machined (420). In this case, the finished cylinder bearing surfaces 53 likewise still require final cleaning.

In accordance with FIG. 8, first of all the cylinder bores 10 are rough-machined (431), then the insertion bevel 54 is formed (410) at the bores 10 of the sprayed cylinder crankcase 8, then the cylinder head sealing surface 14 is finish-machined (420) and then the cylinder bores 10 are finish-machined (432). In this case, the finished cylinder bearing surfaces 53 at least require no further significant cleaning.

In accordance with FIG. 9, first of all the cylinder bores 10 are rough-machined (431), then the insertion bevel 54 is formed (410) at the bores 10 of the sprayed cylinder crankcase 8, then the cylinder bores 10 are finish-machined (432), and then the cylinder head sealing surface 14 is finish-machined (420). In this case, the finished cylinder bearing surfaces 53 likewise still require final cleaning.

In all the sequences illustrated in FIGS. 3 to 9, the abovementioned working steps relating to the introduction of the crankshaft-side end bevel 56 of the cylinder bores 10 are preferably possible in a simple manner by means of a conically designed countersinking or circular milling cutter and the finish-machining of the crankshaft space 55. In particular, it is expedient for the finish-machining of the crankshaft space 55 to be carried out before the finish-machining of the cylinder bearing surfaces 53 or, with the cylinder bore 10 shielded, after the finish-machining of the cylinder bearing surfaces 53.

FIG. 10 illustrates a portion of a cylinder crankcase 8 of a four-cylinder in-line engine with a base plate 9, on which two baffle surfaces 11 are arranged, arranged on its cylinder head sealing surface 14. The base plate 9 in this case covers, counting from the left, the second and fourth cylinder bores 10, whereas the baffle surfaces 11 secured to it, which are of hollow-cylindrical design similar to pieces of tube, are arranged above the first and third cylinder bores 10. On account of the hollow-cylindrical design of the baffle surfaces 11, blasting lances can be introduced through them into the corresponding cylinder bores 10. On account of the baffle surfaces 11 being designed similar to pieces of tube, i.e. on account of the axial extent of the baffle surfaces being at least as great as the opening width of the impinging jet at this location, the baffle surfaces can preferably also be placed on the cylinder head sealing surface 14 without a base plate 9, in which case the cylinder bores 10 which are not to be processed at that time are still shielded. Furthermore, in this case the two blasting lances are also protected from each other's fluid jets, since the baffle surfaces 11 prevent these jets from widening out.

Figure 11:
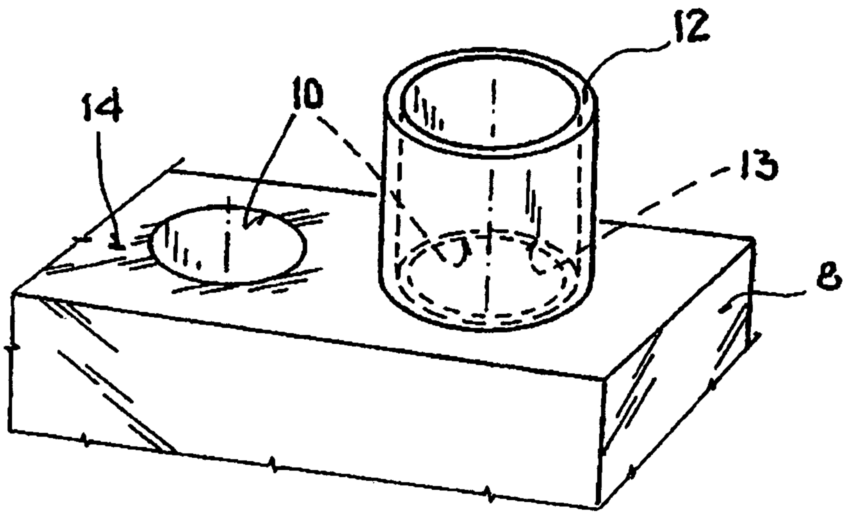
FIG. 11 shows a cylinder crankcase with a spraying template fitted in the region of its cylinder head sealing surface.

FIG. 11 illustrates a portion of a cylinder crankcase 8 of an in-line engine with a spraying template 12 arranged on its cylinder head sealing surface 14. The spraying template 12, which is arranged and fixed on the cylinder head sealing surface 14 concentrically with respect to the cylinder bore 10, has an opening width which is greater than the clear width of the cylinder bore 10. As a result, a circular ring 13 of the cylinder head sealing surface 14 between the cylinder bore 10 and the spraying template 12 remains uncovered. The axial extent of the spraying template 12 is in this case greater than the opening width of a jet of material which is sprayed onto it and has previously been melted and/or externally fused, so that when using spraying templates 12 of this type, the cylinder bores 10 which are not to be coated at that particular time, as well as the outer-side regions of the cylinder head sealing surface 14, are at least substantially shielded and thereby protected from the material jet from a coating lance.

Figure 12:
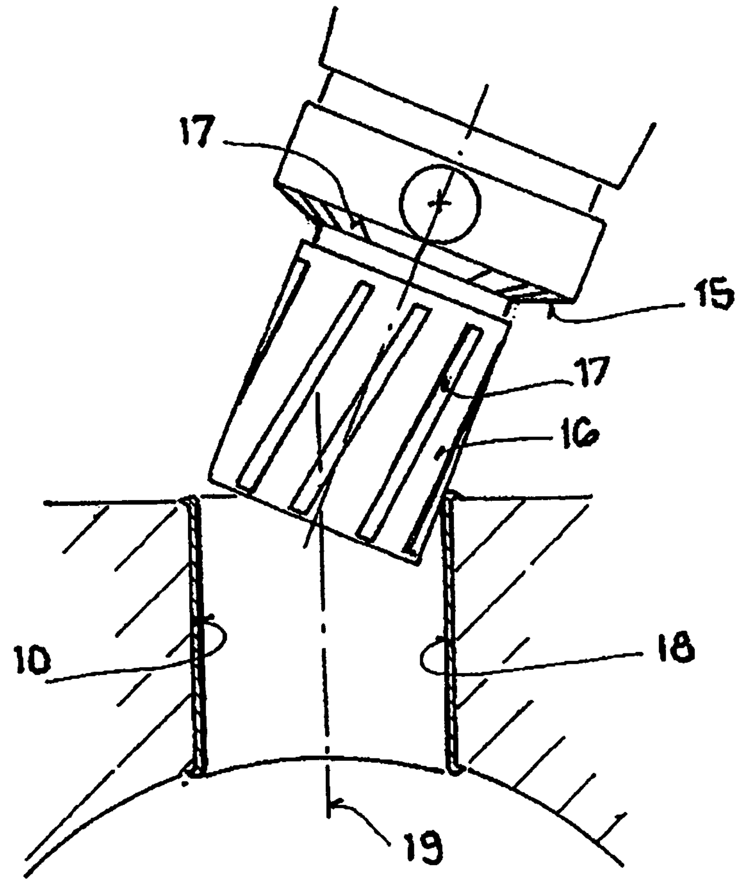
FIG. 12 shows a cone for introduction of a bevel.

FIG. 12 illustrates a tool for introducing a bevel, in particular an insertion bevel 54 or end bevel 56, in a cylinder bore 10 with sprayed cylinder bearing surface 53, the bevel including an angle of between 5 and 15° with the cylinder axis 19. The tool has a cone 15, which can be used to countersink the bevel, in particular the insertion bevel 54.

To orient the cone 15, an insertion pin 16 is arranged at its insertion-side end. The cone 15 and the insertion pin 16, at their engagement-side outer peripheries, have cutting edges 17 which are intended to act in such a manner as to remove material. The cutting edges 17 of the insertion pin 16 substantially machine the coating 18, whereas the cutting edges 17 of the cone machine the coating 18 and subsequently the base material of the cylinder crankcase 8. To orient the cone 15 which is mounted by a universal joint, as illustrated, the insertion pin 16 is placed obliquely onto the upper edge of the cylinder bore 10 and is slowly oriented in the direction of the cylinder axis 19 by continuous, gentle shaking or vibrating movement. In the process, the insertion pin 16 moves into the cylinder bore 10, with the cone 15 being oriented in the same way. Once the cone 15 has been oriented and the insertion pin 16 is at least substantially aligned with the cylinder bore axis 19, the tool is actuated, so that the coating 18 and the insertion bevel 54 are machined in a chip-forming manner. In a preferred embodiment, the cutting edges 17 of the insertion pin 16 are arranged radially adjustably, so that they are only extended into their radial limit position with a chip-forming action and become active after the orientation has taken place.

Figure 13:
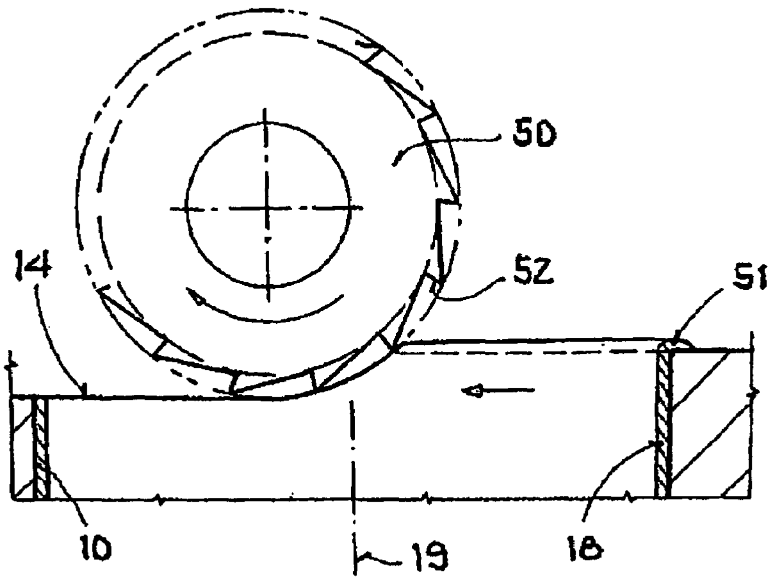
FIG. 13 shows a cylinder head sealing surface during the chip-forming machining.

FIG. 13 illustrates the machining of the cylinder head sealing surface 14. In accordance with the illustration, the cylinder head sealing surface 14 is face-milled. In the process, the milling head 50 is operated so as to rotate in the right-hand direction or clockwise, with the result that the milling cutter teeth 52 move into the material from the outside.

Figure 14:
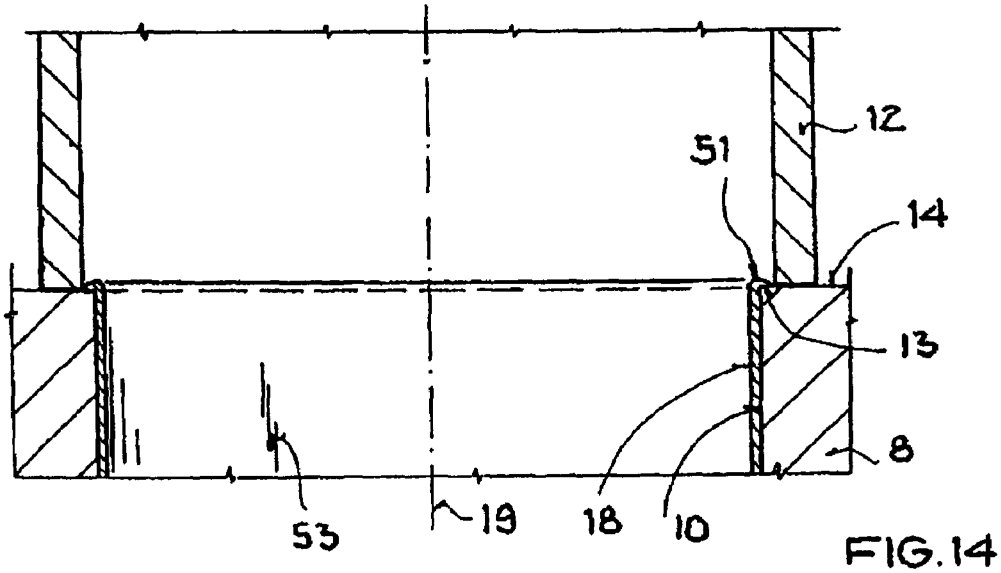
FIG. 14 shows a cylinder bore immediately after coating.

FIG. 14 illustrates a cylinder bore 10 immediately after the coating operation. The spraying template 12 is still on the cylinder head sealing surface 14. The circular ring 13 arranged between the spraying template 12 and the upper cylinder bore opening is covered with a protruding edge coating 51 of coating material. The walls of the cylinder bore 10 are completely covered with the coating 18 of coating material.

Figure 15:
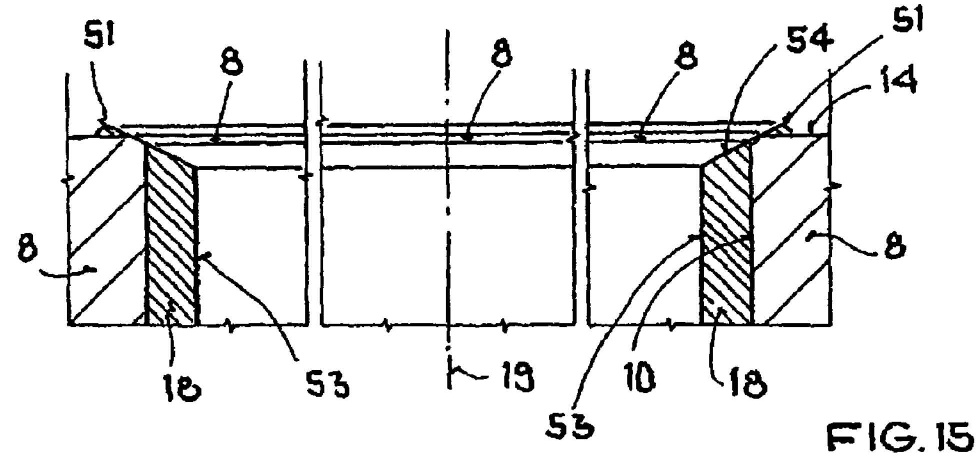
FIG. 15 shows a sprayed cylinder bore with insertion bevel and cylinder head sealing surface with an oversized dimension.

As illustrated in FIG. 15, an insertion bevel 54 is introduced into the upper cylinder bore 10 and its coating 18, in particular by milling. After this bevel has been introduced, the cylinder head sealing surface 14 may still include parts of the edge coating 51. However, as a result of the formation of the insertion bevel, the coating 18 is no longer in direct contact with the cylinder head sealing surface 14. Rather, only the casting material, i.e. the base material, of the cylinder crankcase 8 is still to be found at the transition to the cylinder head sealing surface 14.

Figure 16:
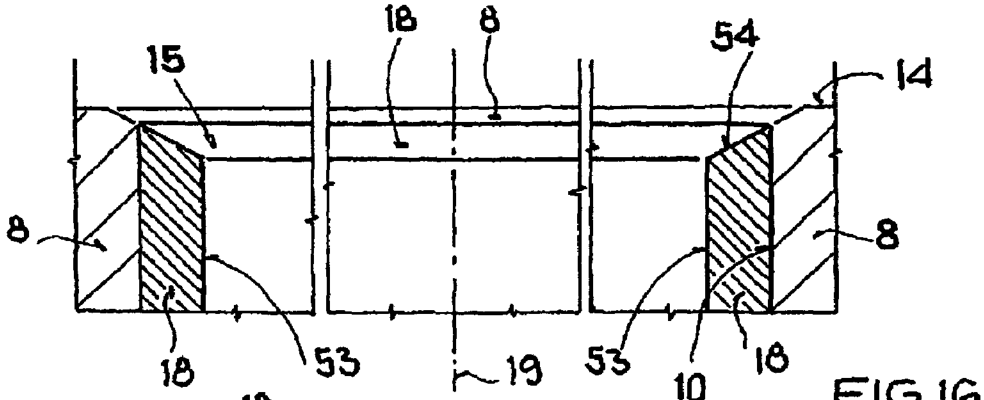
FIG. 16 shows a sprayed cylinder bore with insertion bevel and cylinder head sealing surface at its final dimension.

Next, as illustrated in FIG. 16, the oversized dimension of the cylinder head sealing surface 14 is removed, with the result that, inter alia, the edge coating 51 is also removed in a simple way. The depth of introduction and the setting angle of the cone 15 which forms the insertion bevel 54 are selected in such a manner that even after removal of the oversized dimension the coating 18 is no longer in direct contact with the cylinder head sealing surface 14. This ensures, in particular during the face-milling of the cylinder head sealing surface 14, that the coating is not endangered as a result. In particular, there is no weakening of the bonding in the region of the transition to the wall of the cylinder bore 10, as occurs, for example, as a result of the coating 18 being lifted off or flaking off at a microscopic level on account of the action of a cutting edge 17, in particular a milling cutter tooth 52.

Figure 17:
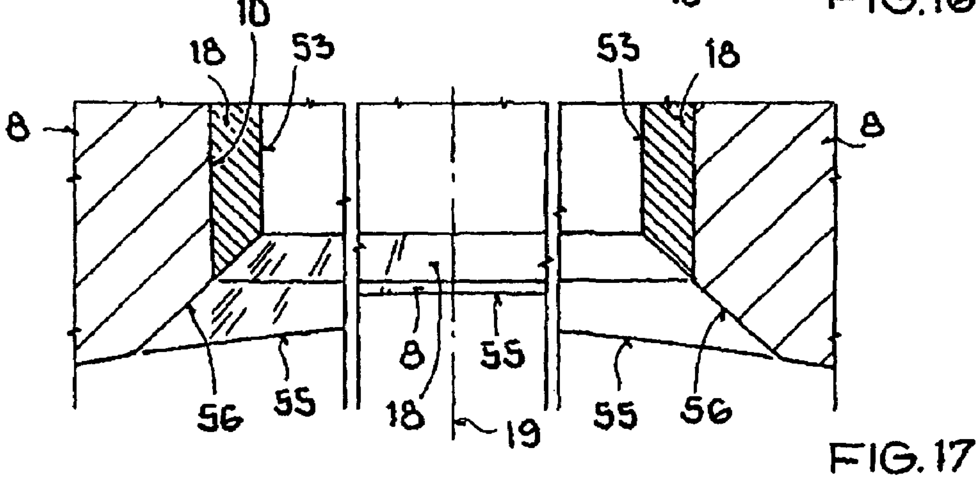
FIG. 17 shows a section through a coated cylinder bore of a cylinder crankcase with adjoining crankshaft space.

FIG. 17 illustrates this state of affairs with reference to the lower bevel of the cylinder bore 10, i.e. the end bevel 56. In this case too, after introduction of the end bevel 56, there is no longer any coating 18 at the transition from the cylinder which has not yet been finish-machined and from the finish-machined cylinder which includes the finished cylinder bearing surfaces 53 into the crankshaft space 55.

Figure 18:
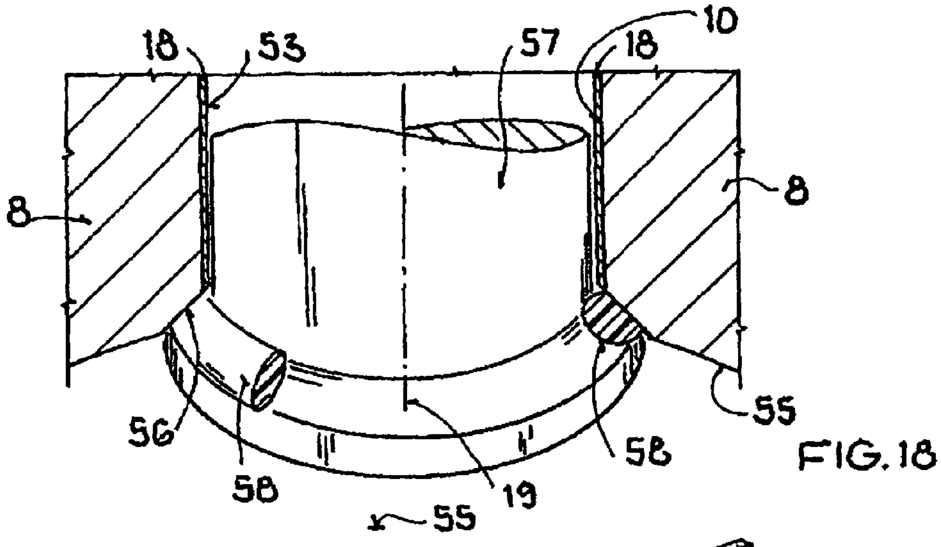
FIG. 18 shows a coated cylinder bore in the region of its end bevel with a sealing ram fitted.

FIG. 18 illustrates a sealing ram 57 which has been pulled into the cylinder from below, i.e. from the direction of the crankshaft space 55. On the direction on which it is pulled in, the sealing ram 57 has a shank, the external diameter of which is smaller than the clear width of the coated cylinder bore 10. At its lower end region, the sealing ram 57 has an encircling groove in which a sealing elastomer, in particular a sealing ring 58, is arranged. Below this groove, the external diameter of the sealing ram 57 is larger than the clear width of the coating cylinder bore 10, and consequently the sealing ring 58 bears in a sealing manner against the end bevel 56. By this measure it is possible, inter alia, to process the crankshaft space 55, preferably to subject it to reaming and/or high-pressure cleaning by means of a water jet preferably mixed with preservative and/or cleaning agent. Furthermore, chip-forming machining is also possible. This is particularly advantageous in particular in the case of cylinder bearing surfaces 53 which have already been finish-machined.

Figure 19:
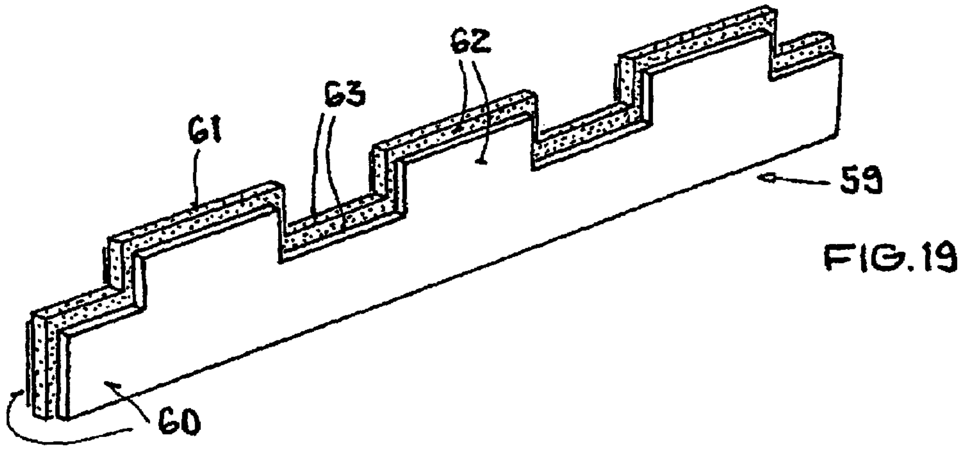
FIG. 19 shows a shielding template for V engines.
Figure 20:
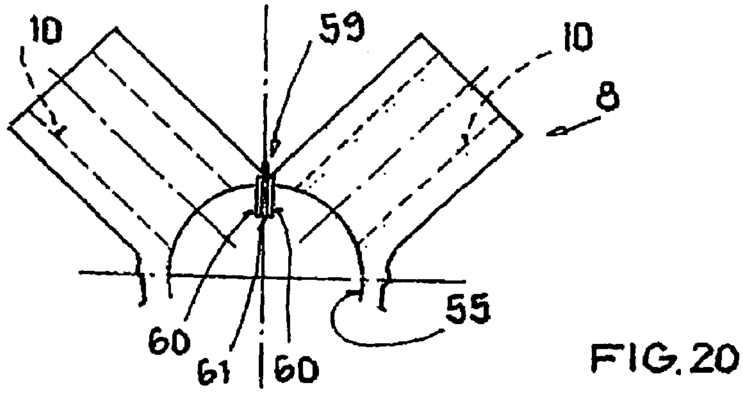
FIG. 20 shows the fitting of the shielding template in the region of the crankshaft space between two cylinder lines of a V engine.

When coating cylinder bores 10 of multi-line engines, such as V and/or W engines, disruptive deposits of material are constantly formed in cylinder bores 10 which belong to a cylinder line which is parallel to the line currently being processed. In this respect, it is expedient for a shielding template 59, as illustrated by way of example in FIG. 19, to be arranged between the two cylinder lines (cf. FIG. 20) on the crankshaft side.

The shielding template 59 has two outer metal stabilizing plates 60 and a sealing lip 61, preferably formed from elastomeric material, arranged parallel to and between them. The shielding template 59 is in this case shaped in such a way that it approximately corresponds to the negative of the surface onto which it is placed between the two lines of cylinders. The extent of the metal sheets 60 in the direction of the bearing surface is advantageously less than that of the sealing lip 61, so that good bearing contact is possible.

The shielding template 59 is of toothed design on the bearing side. This allows the toothed base 63 to be placed in the region of the balancing weights of the crankshaft and the teeth to be placed in the region of the crankshaft bearing arrangement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A process for processing cylinder crankcases comprising:

casting a cylinder crankcase with cylinder barrels, roughening surfaces of the cylinder barrels which are to be thermally coated, coating the cylinder barrels by a thermal spraying process, at least partially removing the coating material from a crankshaft side part of the cylinder crankcase after coating the cylinder barrels by a jet including a cleaning agent, a preservative, or a cleaning agent and a preservative, and remachining the cylinder barrels to their final dimensions.

2. The process as claimed in claim 1, wherein the jet is operated with a pressure of between 300 and 2000 bar.

3. The process as claimed in claim 1, wherein between 1 and 5% by volume of said cleaning agent, said preservative, or said cleaning agent and said preservative is added to the jet.

4. The process as claimed in claim 1, wherein, during removal of the coating material, the cylinder is covered with respect to a crankshaft space by way of a ram introduced into the cylinder or moved onto an end bevel, the ram being placed against the end bevel in such a manner as to form a seal.

5. The process as claimed in claim 1, wherein machining of the cylinder barrels to their final dimensions is carried out after a crankshaft space has been finish-machined.

6. The process as claimed in claim 1, wherein the coated cylinder barrels are pre-processed, a crankshaft space is subsequently finish-machined, and, next, the cylinder barrels are machined to final dimensions in one or more steps.

7. The process as claimed in claim 1, wherein the jet comprises a liquid.

8. The process as claimed in claim 1, wherein the jet comprises a liquid mixed with solid particles.

9. The process as claimed in claim 1, wherein the jet comprises water.

10. The process as claimed in claim 8, wherein the jet further comprises water.

11. The process as claimed in claim 8, wherein the liquid is water.

12. The process as claimed in claim 7, wherein the liquid is water.

13. The process as claimed in claim 2, wherein the pressure is between 300 and 800 bar.

14. The process as claimed in claim 4, wherein said seal aids in forming a sealing closure.

15. A cylinder crankcase processed in accordance with the process of claim 1.

* * * * *